US008950786B2

(12) United States Patent
Kochendoerfer et al.

(10) Patent No.: US 8,950,786 B2
(45) Date of Patent: Feb. 10, 2015

(54) COUPLING DEVICE FOR TRANSFERRING A MEDIUM FROM A STATIONARY PART TO A ROTATABLE PART

(75) Inventors: Ralf Kochendoerfer, Leonberg (DE); Tobias Gnausch, Muehlhausen (DE)

(73) Assignee: Robert Bosch GmbH, Stuttgart (DE)

( * ) Notice: Subject to any disclaimer, the term of this patent is extended or adjusted under 35 U.S.C. 154(b) by 410 days.

(21) Appl. No.: 12/682,981

(22) PCT Filed: Oct. 13, 2008

(86) PCT No.: PCT/EP2008/063733
§ 371 (c)(1),
(2), (4) Date: Aug. 10, 2010

(87) PCT Pub. No.: WO2009/056439
PCT Pub. Date: May 7, 2009

(65) Prior Publication Data
US 2010/0295294 A1 Nov. 25, 2010

(30) Foreign Application Priority Data
Oct. 29, 2007 (DE) .......................... 10 2007 051 562

(51) Int. Cl.
*B23Q 1/00* (2006.01)
(52) U.S. Cl.
CPC .................................... *B23Q 1/0018* (2013.01)
USPC .................. 285/121.3; 285/121.5; 285/121.6; 285/272; 285/281
(58) Field of Classification Search
USPC ........... 285/121.3, 10–11, 96, 98, 106, 121.1, 285/121.6, 272, 281, 121.5
See application file for complete search history.

(56) References Cited

U.S. PATENT DOCUMENTS

| 2,701,146 | A | * | 2/1955 | Warren | 285/121.5 |
| 2,849,244 | A | * | 8/1958 | Sampson | 285/121.3 |
| 2,910,309 | A | * | 10/1959 | Snyder et al. | 285/41 |
| 3,326,579 | A | * | 6/1967 | Fowler | 285/10 |
| 3,950,017 | A | * | 4/1976 | Beurer | 285/124.3 |

(Continued)

FOREIGN PATENT DOCUMENTS

| DE | 3542014 | 1/1987 |
| DE | 19959072 | 6/2001 |

(Continued)

OTHER PUBLICATIONS

International Search Report, PCT International Patent Application No. PCT/EP2008/063733, dated Jan. 26, 2009.

*Primary Examiner* — Aaron Dunwoody
*Assistant Examiner* — Fannie Kee
(74) *Attorney, Agent, or Firm* — Kenyon & Kenyon LLP

(57) ABSTRACT

A coupling device for transferring a medium from a stationary part to a rotating part, including a stationary first ring, which is fixed in place on a stationary part, a second, rotatable ring, which is fixed in place on a rotatable part and rotates along with the rotatable part, a bearing, which is situated between the first ring and the second ring, an annular gap, which is situated between the first ring and the second ring, a supply line, which is disposed at the first ring for the supply of the medium, a discharge line, which is situated at the second ring for the conveying of the medium, the discharge line rotating along with the second ring, an inner sealing element, which seals the annular gap at a radially inner side, and an outer sealing element, which seals the annular gap at a radially outer side.

12 Claims, 2 Drawing Sheets

(56) References Cited

U.S. PATENT DOCUMENTS

| | | | |
|---|---|---|---|
| 4,726,397 A * | 2/1988 | Stich | 137/580 |
| 4,844,138 A * | 7/1989 | Kokubu | 152/417 |
| 5,240,039 A | 8/1993 | Colussi et al. | |
| 5,908,060 A * | 6/1999 | Fargeot | 144/4.1 |
| 6,412,822 B1 * | 7/2002 | Omiya et al. | 285/121.3 |
| 6,485,062 B2 * | 11/2002 | Omiya et al. | 285/121.1 |
| 6,929,099 B2 | 8/2005 | Jakob et al. | |
| 2002/0017785 A1 * | 2/2002 | Omiya et al. | 285/121.3 |
| 2004/0200670 A1 | 10/2004 | Jakob et al. | |

FOREIGN PATENT DOCUMENTS

| | | |
|---|---|---|
| JP | 55-166590 | 12/1980 |
| JP | 62-132088 | 6/1987 |
| JP | 63-19488 | 1/1988 |
| JP | 4-236883 | 8/1992 |
| JP | 2000-46275 | 2/2000 |
| JP | 2003-185072 | 7/2003 |
| WO | WO 03/104707 | 12/2003 |

* cited by examiner

COUPLING DEVICE FOR TRANSFERRING A MEDIUM FROM A STATIONARY PART TO A ROTATABLE PART

FIELD OF THE INVENTION

The present invention relates to a coupling device for transferring a medium from a stationary part to a rotatable part.

BACKGROUND INFORMATION

Machines such as machine tools or measuring machines, for example, are usually equipped with clamping devices, with whose aid a component can be clamped for processing or for a measuring operation. Generally, such clamping devices are situated at rotatable spindles and are able to be tightened or untightened mechanically or with the aid of a pressurized medium or with the aid of a vacuum. Conventionally, in this context, for example, a pressure line is routed in an axis of rotation of the rotatable part and the working medium is supplied or discharged for the clamping operation or the release operation in the process. In general, such clamping devices have been tried and tested. It may happen, however, that technical reasons make it impossible to place the line for the medium in the axis of rotation. Complicated constructions are then required for routing the medium from the stationary part to the rotating part and to the clamping devices. Also, there are application situations in which the retrofitting of a clamping device operated using a medium is desired.

SUMMARY

In contrast, a coupling device according to an example embodiment of the present invention for transferring a medium from a stationary part to a rotatable part may have the advantage that it allows simple and secure coupling between the stationary part and the rotatable part in order to transfer a medium from the stationary part to the rotatable part or to discharge it. The example coupling device according to the present invention therefore provides a connection between a stationary line component for the medium and a line component for the medium that is rotating along with the rotatable part. The example coupling device according to the present invention may have a simple structure and is able to be produced in a cost-effective manner. Furthermore, it is easy to retrofit the example coupling device according to the present invention with chucks even in the case of existing spindles, for example. The example embodiment of the present invention makes this possible by providing the coupling device with a stationary first ring and a rotatable second ring. The stationary first ring is fixed in place on the stationary part, and the rotatable second ring is fixed in place on the rotatable part and rotates along with it. In addition, a bearing is situated between the first and the second ring, and an annular gap, which is filled with the medium, is provided between the first and the second ring. Disposed at the annular gap is a supply line for the medium, which is situated on the stationary part, and at least one discharge line is disposed at the rotatable second ring, which routes the medium to the clamping device, for example. To ensure the tightness, an inner sealing element which seals the annular gap at a radially inner side, and an outer sealing element which seals the annular gap at a radially outer side are provided.

In addition, the example coupling device preferably includes a compensation unit, which is situated between the stationary first ring and the stationary part. The compensation unit has the task of ensuring a coaxility of the coupling device with respect to an axis of rotation of the rotatable part. This makes it possible, in particular, to compensate an inclination of the first and second ring relative to the axis of rotation.

In an especially preferred manner, the sealing element is a sealing ring, in particular one made from an elastic sealing material, or a labyrinth seal.

According to a further preferred development of the present invention, the bearing between the first and second ring is an antifriction bearing, in particular a ball bearing or a cylindrical roller bearing. The antifriction bearing has an open cage in order to provide a passage for the medium.

In an especially preferred manner, a plurality of discharge lines is situated at the annular gap so that, starting at the annular gap, the medium is able to be routed to a plurality of different points at the rotatable part.

Furthermore, it is preferred that the discharge line is connected to a clamping device for clamping workpieces. This makes it possible to realize a clamping operation of the workpiece using the medium or a vacuum.

In an especially preferred manner, the coupling device is centered with respect to an axis of rotation of the rotatable part. In particular an imbalance during operation is able to be avoided in this manner.

The present invention is able to be used for the retrofitting of mechanical clamping devices, in particular, in order to enable the clamping or releasing with the aid of the medium. In an especially preferred manner, the present invention is used in machine tools or measuring machines for the precise measuring of components. The present coupling device for the medium may also be used for clamping devices or machines in which it is impossible to provide a supply line or a discharge line in the axis of rotation for a variety of reasons.

In an especially preferred manner, the medium is air or oil, and the medium may be kept in a vacuum pressure range or an overpressure range.

Moreover, the present invention may also be used for transferring a medium in the case of hinged bearings or similar devices, for example.

BRIEF DESCRIPTION OF THE DRAWINGS

A coupling device according to an exemplary embodiment of the present invention is described below with reference to the accompanying figures.

DETAILED DESCRIPTION OF EXAMPLE EMBODIMENTS

Below, an example clamping device 1 having a coupling device 2 according to the present invention is described in detail based on a first exemplary embodiment of the present invention with reference to FIG. 1.

Figure 1:
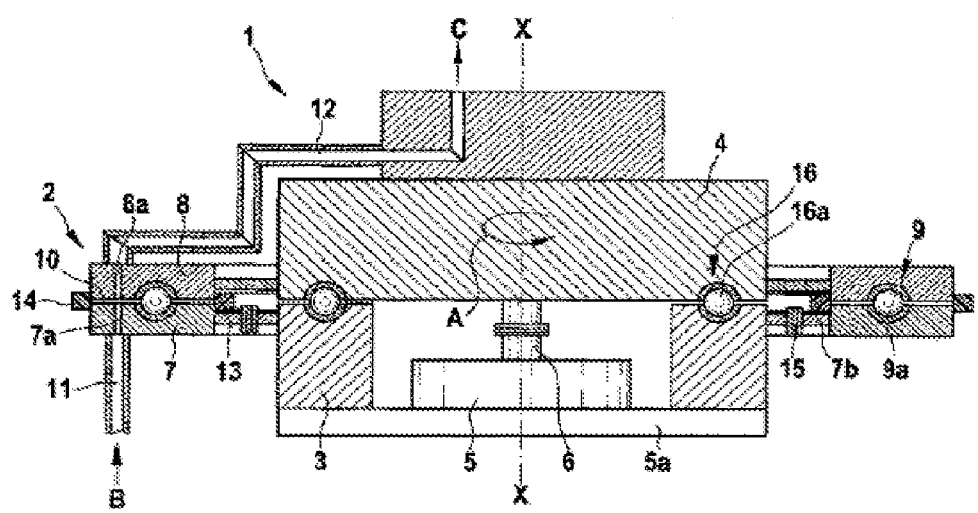
FIG. 1 shows a schematic sectional view of a coupling device in accordance with a first specific embodiment of the present invention.

Clamping device 1, which in this exemplary embodiment is installed in a measuring machine and is able to clamp parts to be measured, is illustrated in FIG. 1 schematically. FIG. 1 shows clamping device 1 without clamping jaws, which, however, are realized in a conventional manner. Clamping device 1 includes a rotatable spindle having a stationary part 3 and a rotating part 4. Provided between stationary part 3 and rotating part 4 is a bearing 16 having a multitude of balls 16*a*. Rotating part 4 rotates about an axis of rotation X-X, in the direction of arrow A. Rotating part 4 is driven via a motor 5, which drives a drive shaft 6 connected to rotating part 4. Motor 5 is fixed in place on stationary part 3 on a base plate 5a. In this exemplary embodiment, the clamping jaws of clamping device 1 are meant to be operated, that is to say, meant to clamp or release a workpiece, using a gaseous medium, especially air, with the aid of overpressure and/or vacuum pressure. This requires the gaseous medium to be able to be transferred from the stationary region of the clamping device to the rotating region.

Coupling device 2 according to the present invention is provided for this purpose, which includes a first stationary ring 7 and a second rotating ring 8. First ring 7 is fixed in place on stationary part 3 of clamping device 1 with the aid of a fixation element 7b. In this exemplary embodiment fixation element 7b is a ring wheel, which is affixed on first ring 7 and on stationary part 3. As an alternative, there is the possibility of using as fixation element a multitude of short, rod-type components, which are disposed along the circumference of stationary part 3.

As shown in FIG. 1, a compensation unit 15 is also provided on fixation element 7b. Compensation unit 15 has the task of allowing an alignment of first ring 7 relative to axis of rotation X-X following the assembly in order to ensure the most accurate concentricity possible of the rotating parts.

A circumferential annular gap 10 is disposed between first stationary ring 7 and second rotating ring 8. Circumferential annular gap 10 is connected to a supply line 11 via a first bore 7a in first ring 7. The medium used for the actuation is supplied via supply line 11. A second bore 8a, which connects annular gap 10 to a discharge line 12, is provided in second rotating ring 8. Discharge line 12 conveys the medium to the clamping jaws (not shown) of the clamping device at rotating part 4 in order to clamp or release a workpiece.

In FIG. 1 the conveying of the medium via supply line 11 is indicated by arrow B, and the further conveying of the medium via discharge line 12 is indicated by arrow C. In addition, a second bearing 9 having a multitude of balls 9a is disposed between stationary ring 7 and rotating ring 8.

To seal annular gap 10 and also bearing 9 between first ring 7 and second ring 8, an inner sealing ring 13 is provided at a radially inner side, and an outer sealing ring 14 at a radially outer side. As shown in FIG. 1, the two sealing rings 13, 14 seal both annular gap 10 and also bearing 9.

The example coupling device according to the present invention functions in the following manner. Via supply line 11, a medium such as pressurized air or also vacuum pressure is able to be conveyed to circumferential annular gap 10 by way of bore 7a. As can be gathered from FIG. 1, annular gap 10 has a width in the radial direction that is greater than a diameter of bores 7a and 8a. Via second bore 8a, which rotates along with second rotating ring 8, the medium is then conveyed to discharge line 12 and routed to the clamping jaws.

Example coupling device 2 according to the present invention is therefore able to transmit pressures from a stationary part to a rotating part in a simple manner. In this context it is especially advantageous that an axis of rotation X-X is not blocked by the coupling device but is able to be provided for the drive via drive shaft 6 in the manner described in the exemplary embodiment. As a result, it is possible, in particular, to provide simple and cost-effective components for the drive. As an alternative, other lead-throughs etc. also are able to be routed through axis of rotation X-X. In addition, coupling device 2 according to the present invention may preferably also be used for retrofitting already existing systems, in particular. For example, already existing clamping devices may be retrofitted without any problems at the outer circumference of the clamping device in order to thereby achieve an uncomplicated conversion, for example from a hydraulic actuation of the clamping jaws to a pneumatic actuation. This, in particular, requires no major technical modifications of the clamping device.

Moreover, compensation unit 15 makes it possible to use coupling device 2 also for tilting and/or centering tables in which rotating part 4 of the spindle is able to be inclined or displaced relative to axis of rotation X-X. In this case such a change in position is able to be compensated with the aid of compensation unit 15.

Figure 2:
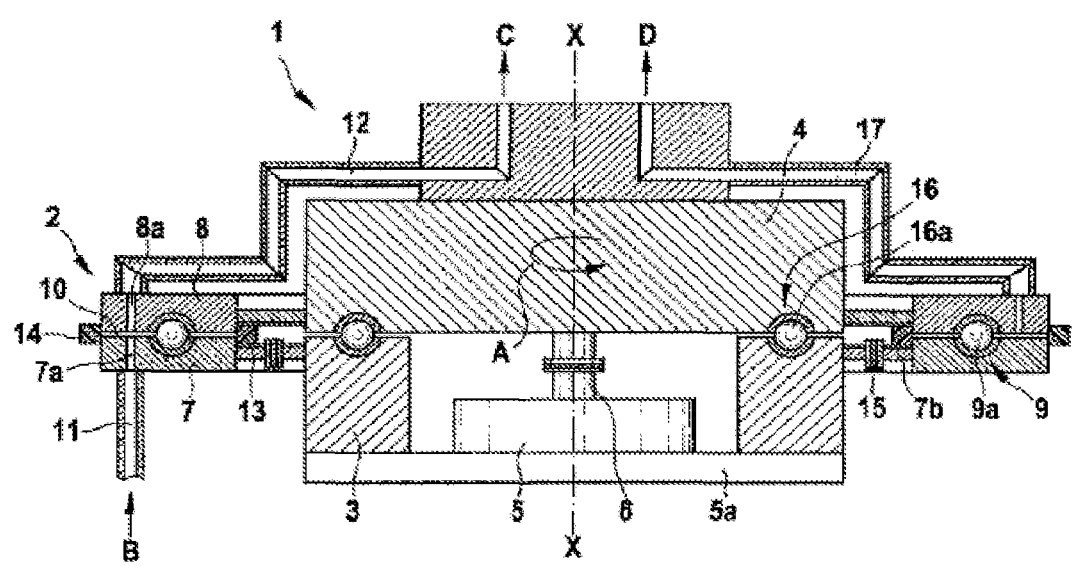
FIG. 2 shows a schematic sectional view of a coupling device according to a second exemplary embodiment of the present invention.

In the following text a clamping device 1 having a coupling device 2 according to a second exemplary embodiment of the present invention is described in detail with reference to FIG. 2. Same or functionally equivalent parts are designated by the same reference numerals as in the first exemplary embodiment.

The second exemplary embodiment generally corresponds to the first exemplary embodiment. In contrast to the first exemplary embodiment, a second discharge line 17 is additionally provided in the second exemplary embodiment. First discharge line 12 has the same design as in the first exemplary embodiment, and second discharge line 17 is disposed at second rotating ring 8 at 180° relative to first discharge line 12. The medium is supplied to second discharge line 17 via annular gap 10. The medium is therefore able to be conveyed to different locations of the clamping device in an uncomplicated manner. Furthermore, coupling device 2 according to the second exemplary embodiment has slightly higher stability because the rotating parts are implemented symmetrically with respect to axis of rotation X-X. Arrow D in FIG. 2 denotes the medium discharged via second discharge line 17.

In all other respects this exemplary embodiment corresponds to the first exemplary embodiment, so that reference is made to the description supplied there.

What is claimed is:

1. A coupling device for transferring a medium from a stationary component to a rotating component, comprising:
    a stationary first ring fixed in place on a stationary part;
    a second rotatable ring fixed in place on a rotatable part and adapted to rotate along with the rotatable part;
    a bearing situated between the first ring and the second ring;
    an annular gap situated between the first ring and the second ring;
    a supply line situated at the first ring for a supply of the medium into the annular gap;
    a discharge line situated at the second ring for conveying the medium from the annular gap, the discharge line rotating along with the second ring;
    an inner sealing element which seals the annular gap at a radially inner side;
    an outer sealing element which seals the annular gap at a radially outer side; and
    a compensation unit situated between the stationary ring and the stationary part to align a position of the first ring relative to an axis of rotation,
    wherein the supply line and the discharge line do not run through an axis of rotation of the rotatable part,
    wherein the bearing between the first ring and the second ring is an antifriction bearing, the antifriction bearing being a ball bearing having an open cage.

2. The coupling device as recited in claim 1, wherein the inner sealing element and outer sealing element are one of a sealing ring or a labyrinth seal.

3. The coupling device as recited in claim 1, wherein a plurality of discharge lines is disposed at the second rotatable ring.

4. The coupling device as recited in claim 1, wherein the discharge line is connected to a clamping device for the clamping of workpieces.

5. The coupling device as recited in claim 1, wherein the coupling device is centered relative to an axis of rotation of the rotatable part.

6. The coupling device as recited in claim 1, wherein the discharge line situated at the second ring conveys the medium to a clamping device for the clamping or releasing of workpieces.

7. The coupling device as recited in claim 1, wherein the annular gap is filled with the medium.

8. The coupling device as recited in claim 1, wherein the annular gap is coupled to the supply line and the discharge line.

9. The coupling device as recited in claim 1, wherein the annular gap is disposed between the supply line and the discharge line.

10. The coupling device as recited in claim 1, wherein the medium is guided through the annular gap in order to transfer the medium from the stationary component to the rotating component.

11. A clamping device including a coupling device, the coupling device comprising:
- a stationary first ring fixed in place on a stationary part;
- a second rotatable ring fixed in place on a rotatable part and adapted to rotate along with the rotatable part;
- a bearing situated between the first ring and the second ring;
- an annular gap situated between the first ring and the second ring;
- a supply line situated at the first ring for a supply of a medium into the annular gap;
- a discharge line situated at the second ring for conveying the medium from the annular gap, the discharge line rotating along with the second ring;
- an inner sealing element which seals the annular gap at a radially inner side; and
- an outer sealing element which seals the annular gap at a radially outer side,
- wherein the supply line and the discharge line do not run through an axis of rotation of the rotatable part,
- wherein the discharge line is connected to the clamping device for the clamping of workpieces,
- wherein the bearing between the first ring and the second ring is an antifriction bearing, the antifriction bearing being a ball bearing having an open cage.

12. A machine tool or measuring machine, including a clamping device, the clamping device including a coupling device, the coupling device comprising:
- a stationary first ring fixed in place on a stationary part;
- a second rotatable ring fixed in place on a rotatable part and adapted to rotate along with the rotatable part;
- a bearing situated between the first ring and the second ring;
- an annular gap situated between the first ring and the second ring;
- a supply line situated at the first ring for a supply of a medium into the annular gap;
- a discharge line situated at the second ring for conveying the medium from the annular gap, the discharge line rotating along with the second ring;
- an inner sealing element which seals the annular gap at a radially inner side; and
- an outer sealing element which seals the annular gap at a radially outer side,
- wherein the supply line and the discharge line do not run through an axis of rotation of the rotatable part,
- wherein the discharge line is connected to the clamping device for the clamping of workpieces,
- wherein the bearing between the first ring and the second ring is an antifriction bearing, the antifriction bearing being a ball bearing having an open cage.

* * * * *